Feb. 3, 1931.　　　H. D. EATON　　　1,791,477
THERMOSTAT MECHANISM
Filed June 23, 1926
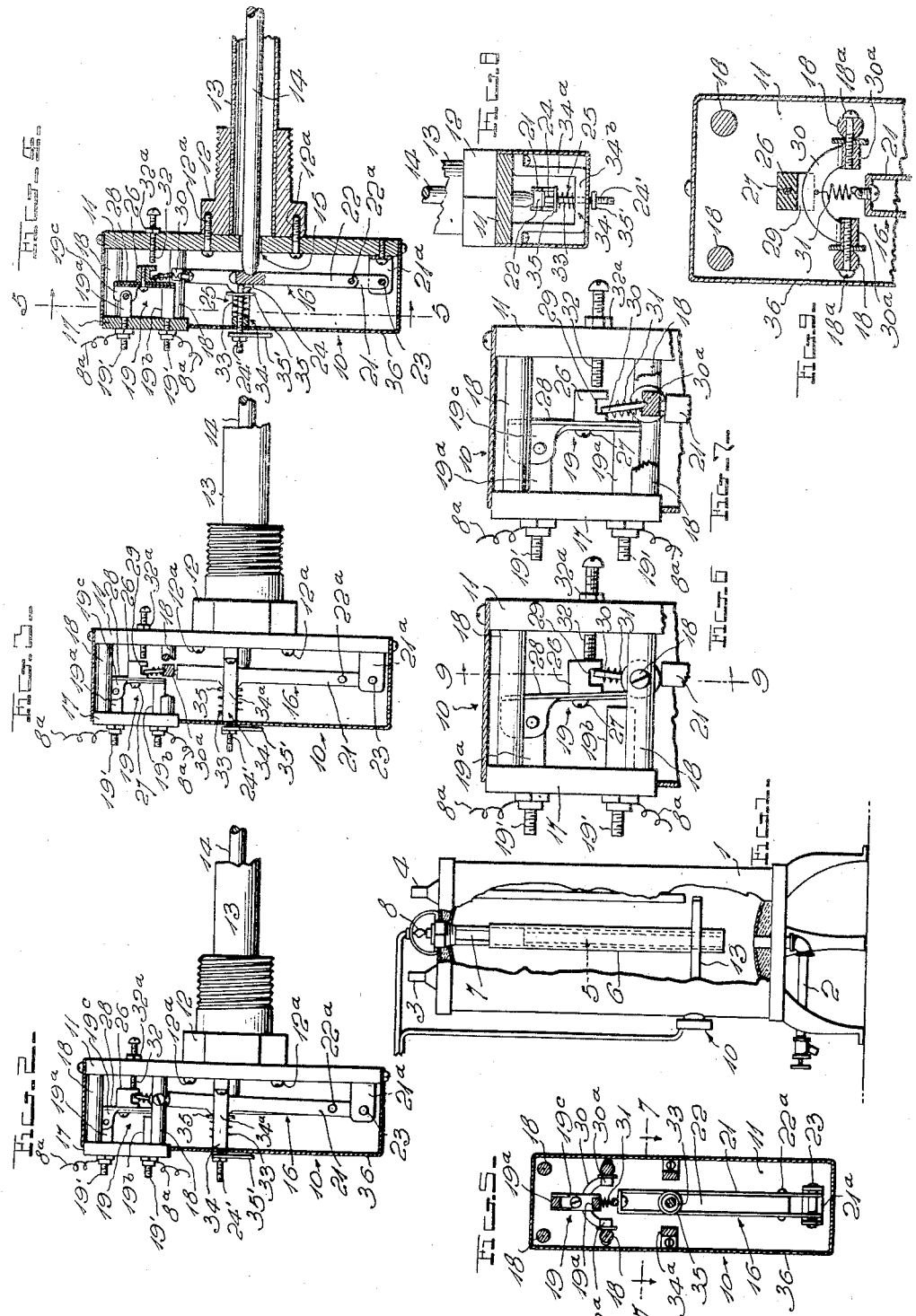

Patented Feb. 3, 1931

1,791,477

UNITED STATES PATENT OFFICE

HAROLD D. EATON, OF LA PORTE, INDIANA, ASSIGNOR TO BASTIAN-MORLEY CO., OF LA PORTE, INDIANA, A CORPORATION OF INDIANA

THERMOSTAT MECHANISM

Application filed June 23, 1926. Serial No. 117,897.

This invention relates to a thermostat mechanism, more particularly a mechanism adapted to actuate a movable member in one direction or the other due to temperature changes of the medium surrounding the thermostat element or elements.

One object of the invention is to provide an improved mechanism of this character that is simple and economical in construction.

Another object of the invention is to provide a mechanism of this character that is positive in operation and capable of controlling the movable element within or by reason of slight changes in the temperature of the medium to be controlled.

A further object of the invention is to construct a mechanism of this character in which an electric switch is operated with a snap action to insure positive closing and opening without danger of arcing.

Other objects of the invention will be apparent to those skilled in the art to which my invention relates from the following description taken in connection with the accompanying drawings, wherein Fig. 1 is a side elevation, with parts broken away, of an electric heater having associated with it a thermostat mechanism embodying my invention.

Fig. 2 is a fragmentary view of the thermostat mechanism, with the switch element in open position.

Fig. 3 is a view similar to Fig. 2, but showing the switch element in position to close the circuit.

Fig. 4 is a sectional view.

Fig. 5 is a section on the line 5—5 of Fig. 4.

Figs. 6 and 7 are fragmentary views of Figs. 2 and 3, respectively, enlarged.

Fig. 8 is a section on the line 7—7 of Fig. 5.

Fig. 9 is a section on the line 9—9 of Fig. 6.

In one application of the invention, the movable element controls an electric circuit.

In the preferred arrangement, the circuit energizes an electric heating unit mounted within a container for fluid, such as water, and the thermostat elements extend into the container (as shown in the drawings) or into a conduit or casing which in turn is mounted in the container.

Referring to the drawings, wherein I have illustrated the preferred application of my invention, 1 indicates a tank or container for the fluid, such as water, to be heated. 2 indicates a drain pipe. 3 indicates a supply pipe leading into the container 1 from a suitable source and 4 indicates a discharge or outlet pipe connected to a service system (not shown). 5 indicates an electric heating unit within and extending longitudinally of the container 1, preferably supported in and depending from the top wall thereof. 6 indicates a riser surrounding the heating unit, open at its lower end and having outlet ports 7 at its upper end to permit of circulation of the fluid. 8 indicates the leads connected in a well known manner with the electric supply mains.

No claim is made to the fluid heater herein illustrated since it forms the subject-matter of a co-pending application filed by me on the 17th day of June, 1926, Serial No. 116,615.

10 indicates as an entirety the thermostat mechanism arranged to operate a movable member, such as a switch element of an electric switch, to open and close the electric circuit to the heating unit 5 dependent upon the temperature of the water in the container 1, whereby the water may be heated to a predetermined temperature and automatically maintained substantially at that temperature without attention. By preference, the thermostat elements extend into the tank 1, but they may be arranged within a conduit or separate casing or container connected with the tank. Of the thermostat mechanism, 11 indicates a base, formed of suitable material, such as brass or insulation, as desired, and secured to the body portion of a boss 12 by screws 12a. The boss 12 is provided with screw threads which fit a threaded opening in the side wall of the container 1. 13, 14, indicate the thermostat elements, the former comprising a tube formed of material having a relatively high coefficient of expansion, such as copper, fitted within and supported at its outer end by th boss 12, being secured therein in a manner which insures a liquid tight joint; the other thermostat element comprises a rod preferably formed from material whose coefficient of expansion is substantially zero, at least within certain ranges of temperature, such as lava, porcelain, invar metal, or the like. The tube 13 and rod 14 are connected, preferably by suitable adjustable means, at their inner ends, whereby the expansion of the tube 13 serves to move the rod endwise toward the right as viewed in Figs. 2, 3, and 4, and the contraction of the tube 13 serves to move the rod 14 endwise in the opposite direction. The inner end of the rod 14 projects through an opening 15 formed in the base 11 and is operatively connected with an operating means 16, preferably comprising a plurality of multiplying levers mounted in the manner to be later set forth. 17 indicates a block of insulating material supported in rigid, but spaced relation to the base 11, preferably by rods 18 fixed at their opposite ends to the base and block in any desired manner. On its inner face, the block 17 supports a switch 19 comprising standards 19a, 19b, to one of which is pivotally connected the movable element 19c adapted to engage and disengage the other standard to close and open the electric circuit to the heating unit 5. The shanks of the standards 19a, 19b, extend through the block 17 and form terminals 19' for the leads 8a, one being connected to one lead or terminal of the unit 5 and the other being connected to one of the supply mains so as to interpose the switch 19 in the circuit. The multiplying levers 16 may comprise a main lever 21 pivoted on a bracket 21a and a second lever 22 pivoted on the main lever 21. The main lever 21 preferably comprises a U-shaped member which straddles the second lever 22, the latter being pivoted between the side arms thereof, on a pivot 22a. The bracket 21a comprises a plate having upstanding arms which support the opposite ends of the pivot 23 for the lever 21. 24 indicates an abutment with which the lever 22 engages. As shown in the drawings, the thermostat rod 14 engages the lever 22 between the fulcrum 24 and the pivot 22a on which the lever 22 is mounted, so that endwise or thrust movement of the rod 14 toward the left will swing the lever 22 about the abutment 24 and the lever 22 will in turn swing the lever 21 about its pivot 23 to swing the free end of the latter toward the left. 25 indicates as an entirety the operating connections between the lever 21 and the movable element 19c of the switch 19. Of the operating connections 25, 26 indicates a member fixed to the switch element 19c in any desired manner, preferably by a screw 27, being insulated therefrom by a strip of insulation material 28. The member 26 is formed with a slot 29 in which is disposed the upper or free end of a rocker 30, so that the side walls of the slot form tappets to be engaged by the rocker 30 and operated thereby from one position to the other, as will later be set forth; this arrangement being the equivalent of a pivotal sliding connection between the member 26 and rocker 30 to permit the free movement about their respective pivotal supports. The rocker 30 preferably comprises a substantially U-shaped member trunnioned in any suitable manner at its opposite ends upon the adjacent aligned rods 18. 31 indicates a coiled spring connected at one end to the free end of the lever 21 and at its other end to the upper portion of the rocker 30, and normally tending to swing the latter in one direction or the other, according to the position of the lever 21, as will later appear.

The supports for the rocker 30 may comprise a pair of slotted blocks 30a fixed to the inner sides of the rods 18 by screws 18a, and the lower ends of the rocker may be provided with knife edges that rock on the bottom walls of the slots 30a. By making the rocker of U-shape, provision is made for the free movement of the spring 31.

As shown, the pivot for the lever 21 is preferably disposed in a vertical plane coincident with the pivot for the rocker 30, so that its free end may move to either side of the axis of the pivots or trunnions for the rocker 30. As a result of this arrangement, movement of the lever 21 in one direction will swing the spring 31 to one side of this axis and thus cause the rocker 30 to swing from one position to the other; the movement of the lever 21 in the opposite direction will swing the spring to the other side of this axis and thus operate the rocker in the opposite direction. As the rocker 30 is disposed within the slot 29, the side walls thereof are disposed in the path of movement of its free end and therefore the member 26 will be actuated by the rocker in one direction or the other according to the direction of its movement. The slot 29 is preferably somewhat wider than the thickness of the rocker 30 so that when the lever 21 is actuated from one side of the axis of the pivots or trunnions for the rocker to the other side thereof, the influence of the spring will first impart to the rocker a certain amount of momentum so that it may strike the remote side wall of the slot 29 with a blow and thus operate the switch element 19a with a quick movement, either to open the circuit or to close it, with minimum danger of arcing. 32 indicates a stop for limiting the movement of the switch element 19c outwardly or in a direction to break the circuit, so that relatively slight movement of the free end of the lever 21 may effect operation of the switch element 19c in either direction. The stop 32 is preferably adjustable. For this purpose it may comprise a screw mounted in a threaded opening in the base 11 and locked in its adjusted position by a nut 32a.

As will be understood, the thermostat rod 14 moves endwise toward the left to move the lever 22 and lever 21 about the abutment 24 and pivot 23, respectively, in one direction, to close the switch 19; to effect movement of these levers in the opposite direction, due to expansion of the thermostat tube 13 and endwise movement of the rod 14 toward the right, I provide a coiled spring 33, which normally tends to swing the lever 21 toward the right, as viewed in Figs. 2, 3, and 4, to open the switch 19. The spring 33 is preferably a coiled spring and is interposed between an abutment 34 and an element 35 that bridges the arms of the lever 21. By preference the abutment 34 comprises a yoke 34a mounted on the base 11 and straddling the levers 21 and 22, the end wall 34b of the yoke serving as the abutment for the coiled spring 33. This wall also serves as a support for the fulcrum 24. The fulcrum 24 comprises a rod 24′ having a screw threaded portion extending through a threaded opening in the end wall 34b, whereby its rotation will effect adjustment of its inner end. Such adjustment will affect the action of the rod 14 in swinging the lever 21 to control the switch so that the temperature of the water in the container 1 will be maintained at a higher or lower degree, as may be desired. The spring 33 is coiled around the rod 24′ so that the latter may serve to support it in position, and the bridge for the spring may comprise a washer or collar loosely mounted on the rod 24′. The outer end of the rod 24′ is shaped to receive a suitable tool to adjust its inner end. The outer end of the rod 24′ may carry an indicating arm 35, which moves relative to graduations on the front wall of the casing 36 so that such adjustment can be readily determined. The casing 36 encloses the switch 19 and operating means 16, but is preferably cut away to receive the block 17 to expose the terminals 19′.

Operation: Fig. 2 shows the normal position of the switch member 19c and elements of the operating means 16 when the water in the container 1 is at or above the predetermined degree of temperature, with the rod 14 at its extreme right position. The spring 33 acting on the lever 21 yieldingly maintains it in its inner position and the lever, in turn, through the spring 31, maintains the rocker 30 in its inner position, thus holding the switch 19 open. If now the temperature of the water in the container 1 drops due to cooling or the discharge of heated water therefrom and is replaced with cold water from the pipe 3, the tube 13 will contract and effect endwise outward movement of the rod 14. The rod 14 will in turn act on the lever 22, swinging its lower end about the inner end of the rod 24′. The lever 22 will in turn swing the lever 21 about the pivot 23 and move the spring 33 to the other side of the axis on which the rocker 30 swings. As a result, the free end of the rocker will be operated outwardly, strike the opposite or remote side wall of the slot 29 and swing the switch element 19c to its circuit closing position with a quick, snap action, thus closing the circuit to the heating unit. When the water has been heated to the predetermined temperature, these parts will move in the opposite direction and open the electric circuit.

To those skilled in the art to which my invention relates, many changes in construction and widely differing embodiments and applications of the invention will suggest themselves without departing from the spirit and scope thereof. My disclosures and the description herein are purely illustrative and are not intended to be in any sense limiting.

What I claim is:

1. In mechanism of the class described, the combination with a support and a member movably mounted thereon, of a plurality of operatively connected levers, means normally acting on one terminal lever to move it in one direction, means arranged to act on the other terminal lever to move the first mentioned terminal lever in the opposite direction, a member pivoted at its opposite ends on said support on an axis transverse to and intermediate the travel of said first mentioned terminal lever, said pivoted member being operatively connected to said movable member, and a spring between and connected at its ends to said pivoted member and first mentioned terminal lever and operated by the latter to effect movement of said pivoted member from one side of its axis to the other side thereof.

2. In mechanism of the class described, the combination with a support and a member movably mounted thereon, of a plurality of operatively connected levers, means normally acting on one terminal lever to move it in one direction, means arranged to act on the other terminal lever to move the first mentioned terminal lever in the opposite direction, a U-shaped member pivoted at its opposite ends on said support on an axis transverse to and at opposite sides of said first mentioned terminal lever and intermediate the travel thereof, said U-member being operatively connected to said movable member, and a spring between and connected at its ends to said U-member and first mentioned terminal lever and operated by the latter to effect movement of said U-member from one side of its axis to the other side thereof.

3. In mechanism of the class described, the combination with a support, of a member movably mounted on said support and provided with a pair of spaced tappets, a U-shaped member pivoted at its opposite ends on said support and having its intermediate portion disposed between said tappets and alternately engageable therewith to operate said movable member, a lever swingable in a plane between the ends of said U-member to either side of the axis of the pivots therefor, a coiled expansion spring between and connected at its opposite ends to the central portion of said U-member and said lever, whereby the latter carries the adjacent end of the spring to either side of the pivots for said U-member and effects movement of the latter from one position to the other, and separate means for moving said lever in opposite directions.

In testimony whereof, I have hereunto subscribed my name.

HAROLD D. EATON.